United States Patent [19]

Ottens

[11] Patent Number: 5,396,922

[45] Date of Patent: Mar. 14, 1995

[54] BALL VALVE

[75] Inventor: Jan Ottens, Deventer, Netherlands

[73] Assignee: Nefit Industrial B.V., Deventer, Netherlands

[21] Appl. No.: 237,770

[22] Filed: May 4, 1994

[30] Foreign Application Priority Data

May 4, 1993 [NL] Netherlands ............ 9300749

[51] Int. Cl.[6] .............................................. F16K 5/06
[52] U.S. Cl. .............................. 137/454.2; 251/315.15
[58] Field of Search ............... 251/315 RC, 315 NT; 137/454.2

[56] References Cited

U.S. PATENT DOCUMENTS 3,671,010  6/1972  Scaramucci ............. 251/315 RC X
5,076,542 12/1991  Ottens et al. ........................ 251/315

Primary Examiner—John C. Fox
Attorney, Agent, or Firm—Edmund M. Jaskiewicz

[57] ABSTRACT

Plastic ball valve, with a spherical shut-off member which is provided with a passage and is rotatably accommodated in a cylindrical inner housing, and is coupled to a jack. The inner housing is accommodated in a cylindrical outer housing provided with two connection sockets. The shut-off member is retained in the inner housing by two annular retaining parts lying on either side of the shut-off member. Each retaining part is provided with one or more radially projecting and resilient hook ribs which are accommodated in a peripheral groove formed on the inside, and near one end of the inner housing. The outer housing consists of an essentially cylindrical intermediate housing to which an end flange of a cylindrical connection socket is fixed on either side.

9 Claims, 1 Drawing Sheet

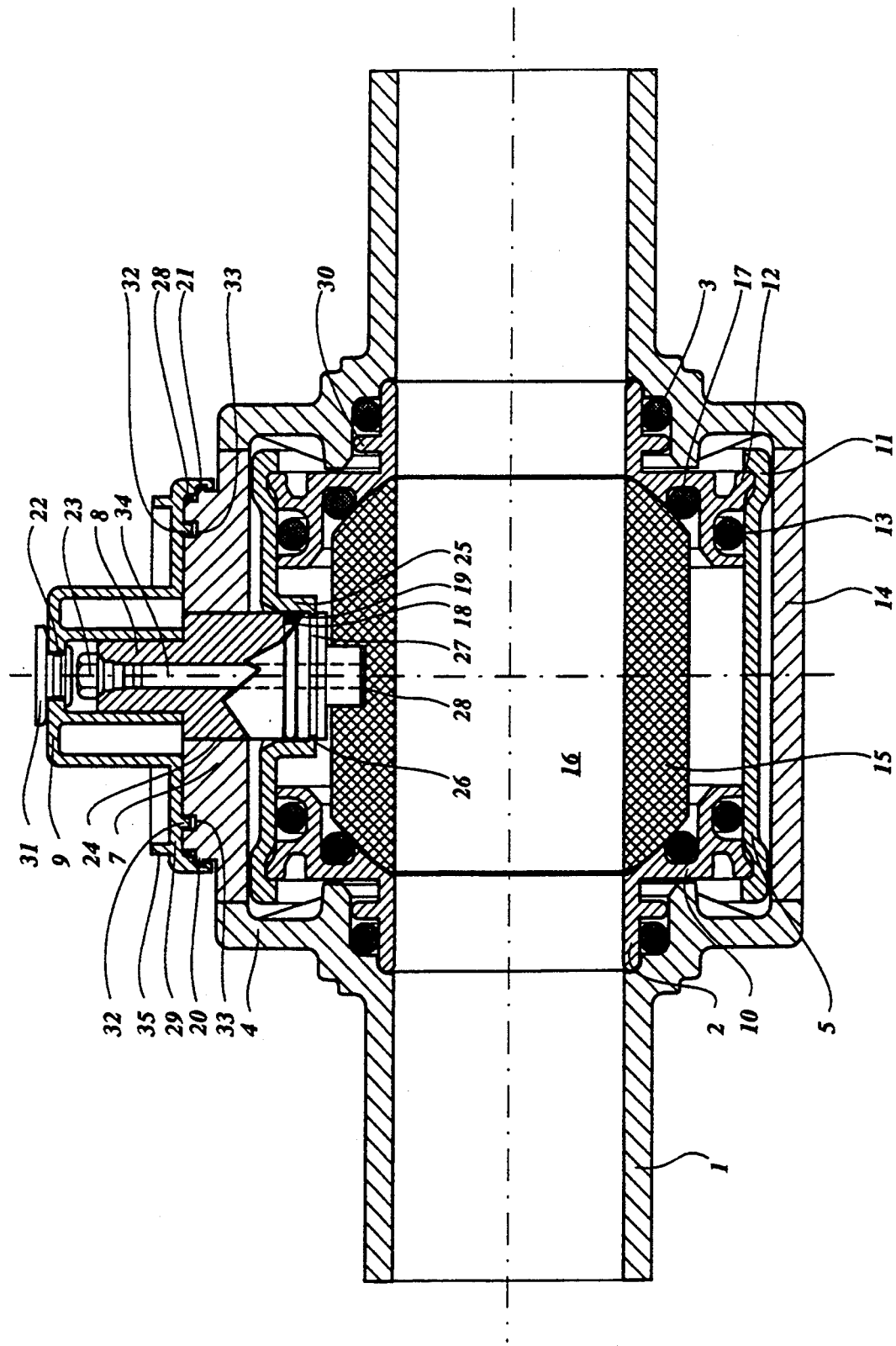

BALL VALVE

BACKGROUND OF THE INVENTION

This invention relates to a plastic ball valve, comprising an essentially spherical shut-off member which is provided with a passage and is rotatably accommodated in an essentially cylindrical inner housing, and is coupled to a jack, which inner housing is accommodated in an essentially cylindrical outer housing provided with two connection sockets.

DISCUSSION OF THE PRIOR ART

Dutch Patent Application No. 9000772 discloses a ball valve, which is made of plastic parts, has a spherical shut-off member which is provided with a passage, and which is accommodated in an inner housing, the inside wall of which at one end forms an accomodation for a sealing ring which rests against the shut-off member. The inner housing is shut off at the other end by a retaining part, the inside wall of which also forms an accomodation for a sealing ring which rests against the shut-off member. The inner housing also has an outward facing guide lying at right angles to the passage, for accommodating a jack which is coupled to the shut-off member.

The shut-off member, the inner housing and the retaining part are accommodated in an outer housing which is made of plastic and is also provided with a guide part for the jack, and which merges at one side into a moulded-on connection socket in which an accommodation is formed on the inside for a sealing ring which seals the outer housing locally relative to the inner housing. The outer housing is shut off at the other end by a second connection socket which is welded to the outer housing, and which has an accommodation on the inside wall for a sealing ring which connects to the outside of a cylindrical end socket of the retaining part which is snapped into the inner housing.

A disadvantage of the above-described design is that very complex, and thus also very expensive, moulds are necessary for the manufacture of the outer housing and the inner housing. Another disadvantage of such a design is that for the manufacture of another ball valve of the same type with a different passage a new shut-off member, inner housing, retaining part, connection socket and a new outer housing have to be manufactured using other moulds, which requires considerable capital investment.

SUMMARY OF THE INVENTION

The object of the invention is to overcome the abovementioned drawbacks by providing a ball valve of the type mentioned in the preamble, making it possible to manufacture ball valves with different passages from a number of standard parts, where the parts can be manufactured with relatively simple moulds, and where relatively little material is needed for manufacturing the parts, nevertheless obtaining a ball valve suitable for high pressure gas applications.

This object is achieved by a plastic ball valve of the abovementioned type, which is characterized in that the shut-off member is retained in the inner housing by two annular retaining parts lying on either side of the shut-off member, each retaining part being provided with one or more radially projecting and resilient hook ribs which are accommodated in a peripheral groove formed on the inside, and near one end of the inner housing.

A plastic ball valve is known per se from U.S. Pat. No. 4,023,773, which ball valve is also provided with a spherical shut-off member and is accommodated in a housing through which a jack, coupled to the spherical shut-off member, is inserted. The shut-off member is retained in the essentially cylindrical housing by means of two annular retaining parts which are provided with sealing rings and, each lying at one end of the housing, retain the shut-off member in a press fit between them. The retaining parts are held in place by an annular securing part which on the outside in the radial direction is provided with a projecting edge which falls into a groove moulded onto the inside of the housing, near one end thereof. In order to prevent the securing part from coming off, it is provided on the inside with an annular pressure part which is pressed against the retaining part by a flange of a connection socket which is fitted on the inside of a threaded screw sleeve screwed onto the externally threaded end of the housing. A sealing ring is provided between the retaining part and the flange of the connection socket. A disadvantage of such a design is that the ball valve is suitable only for regulating liquid flows and, on account of the fact that it is detachable, it must not be used for regulating a gas flow under high pressure. Moreover, a large number of parts are needed for safe functioning of the ball valve.

In a preferred embodiment of the ball valve according to the invention, the inner housing is a symmetrical shape relative to the central transverse plane thereof, with the result that this part can be manufactured with a very simple design of mould. The two retaining parts are preferably identical in this case, so that a considerable batch quantity can be achieved in the manufacture of these parts.

Another advantage of this symmetrical cylindrical shape of the inner housing is that the inner housing can be provided with an inward facing cylindrical guide wall situated at right angles to the axis, for accommodating a jack. Due to the fact that the cylindrical guide wall faces inwards, rather than outwards, as in the abovementioned Dutch publication, the diameter of the outer housing can be reduced to such an extent that the inside of the outer housing lies close to the outside of the inner housing. This produces a very compact construction.

The outer housing is preferably composed of an essentially cylindrical intermediate housing to which an end flange of a cylindrical connection socket is fixed on either side, for example by vibration welding. This means that the intermediate housing, like the inner housing, can also be used in ball valves with different passages. All that is necessary now for making up a ball valve with a different desired passage is for the assembly of control knob, intermediate housing and inner housing to be provided with other retaining parts, other connection sockets and another shut-off member, all having the same desired passage. The result is that there can be more standardization, and more identical parts can be used in ball valves with different passages.

A further advantage in making up the outer housing from an intermediate housing and two connection sockets is that the intermediate housing, like the inner housing, can be an essentially symmetrical cylindrical shape relative to the central transverse plane thereof, with the result that the mould needed for the manufacture of the intermediate housing can be simple in design and thus relatively cheap.

As a result of the abovementioned preferred embodiment, the parts for a series of ball valves with different passages can be manufactured with a small number of simply designed moulds.

In a further embodiment, the retaining part of the ball valve according to the invention is provided with a cylindrical end socket surrounded by a sealing ring which rests against the inside of the connection socket, essentially in the plane of the end flange thereof, for sealing off the outer housing relative to the retaining part, with the result that a reliable seal is obtained.

A further material saving is achieved through the fact that the spherical shut-off member has on the outside two flat portions lying parallel to the passage, a polygonal recess being provided in one flat portion for the accommodation of a complementarily shaped end of a jack.

For ventilation of the space bounded by the inner housing, the spherical shut-off member and the retaining parts, the jack is provided with a channel opening out in the two ends of the jack.

The claims and advantages will be more readily appreciated as the same becomes better understood by reference to the following detailed description and considered in connection with the accompanying drawing.

BRIEF DESCRIPTION OF THE DRAWING

The drawing shows a view, essentially in longitudinal section, of a ball valve according to the invention.

DESCRIPTION OF THE PREFERRED EMBODIMENT

The drawing shows a spherical shut-off member 15 which is flattened off at the top and at the bottom, and which is provided with a passage 16. The circular faces produced by the flattening lie parallel to each other and to the passage 16. A recess 28, in which one end of a jack 8 is accommodated, is provided in the top circular face of the shut-off member 15.

The spherical shut-off member 15, made of plastic, is retained in a cylindrical inner housing 5 by means of two annular retaining parts 10 which at the ends are disposed in the inner housing 5. Placed between the shut-off member 15 and a retaining part 10 is a sealing ring 17 which is partially accommodated in an annular recess of the retaining part 10. The sealing ring 17 prevents fluid running through the passage 16 from entering the space between the shut-off member 15 and the inner housing 5. A sealing ring 13 which rests against the inside of the inner housing 5 is accommodated in a circular groove on the outside of the retaining part 10. The end socket 2 of the retaining part 10 is further provided with a moulded-on, radially projecting rib 30 which forms a stop for a sealing ring 3, in order to prevent said sealing ring from sliding away.

The two retaining parts 10 are accommodated in a press fit near the ends in the cylindrical inner housing 5 by means of a snap connection. The snap connection consists of a groove 11 which lies near one end of the inner housing 5 on the inside, in order to accommodate a radially projecting and resilient peripheral rib 12 of the retaining part 10. The annular retaining part 10 is provided with a passage which is the same size as the passage of the spherical shut-off member 15. The thin-walled inner housing and the two retaining parts can be made from the plastic polyacetal, on account of the suitable resilient properties of this material, which permit a good snap connection between the inner housing and the retaining part.

The inner housing 5 is further provided in the centre with a cylindrical guide wall 25 situated at right angles to the axis and facing inwards from the outside of the inner housing, for supporting the jack 8 which is accommodated at one end in the recess 28 of the shut-off member 15. The guide wall 25 is also provided on the inside, near the-free end, with a radially inward projecting peripheral rib 26 which is accommodated in a radial peripheral groove 27 which is formed on the outside of the jack 8, and by means of which the jack is axially fixed.

The assembly of the inner housing 5, the retaining parts 10 disposed near the ends thereof and the shut-off member 15 retained between them is accommodated in an outer housing which is formed by an essentially cylindrical intermediate housing 14, to which a disc-shaped flange 4 of an essentially cylindrical connection socket 1 is welded in an undetachable and leakfree manner. The intermediate housing 14 and the connection sockets welded to it on either side can both be made of the same plastic material, polyethylene, thus producing a safe and impact-resistant housing for the ball valve. On the outer peripheral part facing away from the jack 8, the intermediate housing 14 is provided with supports (not shown in the FIGURE) for stably placing the ball valve on a base.

The cylindrical connection socket 1 of the outer housing is provided with a passage which is the same as the passage of the shut-off member 15 and of the two retaining parts. The sealing ring 3 of a retaining part 10 lies at the level of the flange in an annular groove in the inside wall of the connection socket 1. The sealing ring 3 prevents fluid from flowing out of the passage into the spaces between the outer housing and the inner housing.

The intermediate housing 14 of the outer housing is symmetrical relative to the central transverse plane thereof and is provided with a partially disc-shaped thickened portion 7 on the outside in the centre.

The thickened portion 7 has in the centre a through-running circular hole 24, which lies at right angles to the axis of the outer housing, and the inside of which forms a guide wall for supporting the jack 8 inserted through the hole 24. The thickened portion 7 is further provided on its peripheral side with a radially projecting peripheral rib 20, which is accommodated in a groove 21 which is moulded onto the inside of a control knob 9. The control knob 9 is fixed to the intermediate housing 14 by means of this snap connection. Between the thickened portion 7 and the control knob 9 lies a sealing ring 28, by means of which the space below the control knob is shut off in a fluidtight manner from the environment in which the ball valve is situated.

The control knob 9 is a thin-walled cap shape, which at one end is provided with a relatively large flange 29 onto the inside of which the groove 21 is moulded and is shut off at the other end. A polygonal tube is moulded onto the shut-off end and through the open end accommodates the complementarily shaped end of the jack 8. The control knob 9 in this embodiment is provided with a hole 22 in the centre, on the axis, which hole is shut off by a disc-shaped sealing cap 31 provided with a sealing ring. When the ball valve is assembled, the sealing cap 31 can be removed to allow access to a safety screw 23, which lies inside the control knob 9 fixed to the outer housing. On the inside of the flange 29 there are two lobes 32 which are situated in partial circle-shaped recesses 33 of the thickened portion 7. The combination of the lobes 32 and recesses 33 provides the stops for defining the operating positions of the ball valve. The flange 29 is also provided with an annular upright edge 35, which serves as a stop edge for the end of a so-called standpipe when the valve is installed underground.

The part of the jack 8 facing the shut-off member 15 is an essentially cylindrical shape and on the peripheral side is provided with a groove 18 which lies at right angles to the axis of the jack 8. A sealing ring 19, which rests against the inside of the cylindrical guide wall 25 of the inner housing 5, is accommodated in said groove 18. The sealing ring 19 ensures that the spaces on the inside of the inner housing and on the outside of the inner housing are separated from each other in a fluid-tight manner. The jack 8 is provided along its axis with a channel 34 which opens out at both ends of the jack 8, and in which the safety screw 23, which is provided with a sealing ring, can be fitted at the free end.

In order to assemble the abovementioned ball valve, the following operations must be performed. The sealing rings 3, 17 and 13 are fitted on a retaining part 10 at the places intended for them. After the sealing rings have been fitted, the retaining part 10 is pushed into the inner housing 5 until the peripheral rib 12 of the retaining part falls into the groove 11 of the inner housing 5. The shut-off member 15 is then pushed inwards from the other end of the inner housing 5.

Next, the second retaining part 10 provided with sealing rings 3, 17 and 13, is inserted into the other end of the inner housing 5 until here too the peripheral rib 12 of said retaining part falls into the peripheral groove 11 formed near the end of the inner housing 5. Through the above operations, the shut-off member 15 is retained in the inner housing 5, and the correct pre-tension on sealing rings 17 and 13 is ensured.

The inner housing 5, with the retaining parts 10 provided on either side thereof, is then pushed into the outer housing 14, following which the jack 8, which is provided with the sealing ring 19 and the safety screw 23, is inserted from the outside through the hole 24 through the thickened portion 7 of the intermediate housing 14, and through the inner housing 5 at the inside of the cylindrical guide wall 25, until the jack 8 is fixed relative to the inner housing through the fact that the radially projecting peripheral rib 26 moulded onto the guide wall 25 falls into the peripheral groove 27. One end of the jack 8 in this case lies in the recess in the top side of the shut-off member 15.

The flange 4 of a connection socket 1 is then fixed by vibration welding on either side of the intermediate housing 14, with the result that an outer housing which cannot be disassembled is formed for the ball valve.

The control knob 9 provided with the sealing cap 31 is then pushed into an angular position, determined by desired operating positions of the shut-off member 15, over the thickened portion 7 which is moulded onto the intermediate housing 14, and on which the sealing ring 28 lies, until the peripheral rib 20 of the thickened portion 7 snaps into the peripheral groove 21 of the control knob 9.

Owing to the "separate" construction of inner housing and outer housing, a large part of the mechanical load is not passed on to the seals 17 on the shut-off member 15, which helps to ensure a long service life of the ball valve.

Relatively thick sealing rings are preferably used in the ball valve according to the invention, so that the construction allows great tolerance. This means that a lower accuracy grade can be selected for the injection moulding of parts, which lowers the manufacturing costs of the moulds and parts.

While the invention has been described and illustrated in its preferred embodiment, it should be understood that departures may be made therefrom within the scope of the invention, which is not limited to the details disclosed herein.

What is claimed is:

1. A plastic ball valve, comprising an essentially spherical shut-off member which is provided with a passage and is rotatably accommodated in an essentially cylindrical inner housing, and is coupled to a jack, which inner housing is accommodated in an essentially cylindrical outer housing provided with two connection sockets, wherein the shut-off member is retained in the inner housing by two annular retaining parts lying on either side of the shut-off member, each retaining part being provided with one or more radially projecting and resilient hook ribs which are accommodated in a peripheral groove formed on the inside, and near one end of the inner housing.

2. A ball valve according to claim 1, wherein the inner housing is an essentially symmetrical shape relative to the central transverse plane thereof.

3. A ball valve according to claim 1, wherein the two retaining parts are identical.

4. A ball valve according to claim 1, wherein the inner housing is provided with an inward projecting cylindrical guide wall situated at right angles to the passage and having a rib projecting radially inwards for supporting and fixing the jack.

5. A ball valve according to claim 1, wherein the outer housing consists of an essentially cylindrical intermediate housing to which an end flange of a cylindrical connection socket is fixed on either side.

6. A ball valve according to claim 5, wherein the intermediate housing is an essentially symmetrical shape relative to the central transverse plane thereof.

7. A ball valve according to claim 5, wherein the retaining part is provided with a cylindrical end socket surrounded by a sealing ring which rests against the inside of the connection socket, essentially in the plane of the end flange thereof, for sealing off the outer housing relative to the retaining part.

8. A ball valve according to claim 1, wherein the spherical shut-off member has on the outside two flat portions lying parallel to the passage, a polygonal recess being provided in one flat portion for the accommodation of a complementarily shaped end of a jack.

9. A ball valve according to claim 1, wherein the jack is provided with a channel opening out in the two ends of the jack.

* * * * *